United States Patent
Hiramaki et al.

(10) Patent No.: US 8,115,811 B2
(45) Date of Patent: Feb. 14, 2012

(54) VEHICLE SURROUNDING AREA DISPLAY DEVICE

(75) Inventors: Takashi Hiramaki, Aichi (JP); Jun Adachi, Aichi (JP); Kazuya Watanabe, Aichi (JP); Kosuke Sato, Aichi (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 944 days.

(21) Appl. No.: 12/093,857

(22) PCT Filed: Nov. 8, 2006

(86) PCT No.: PCT/JP2006/322250
§ 371 (c)(1),
(2), (4) Date: May 15, 2008

(87) PCT Pub. No.: WO2007/058095
PCT Pub. Date: May 24, 2007

(65) Prior Publication Data
US 2009/0268025 A1     Oct. 29, 2009

(30) Foreign Application Priority Data
Nov. 17, 2005   (JP) ................................. 2005-332714

(51) Int. Cl.
*H04N 7/18*   (2006.01)

(52) U.S. Cl. .................................................... 348/148

(58) Field of Classification Search ................... 348/148
See application file for complete search history.

(56) References Cited

U.S. PATENT DOCUMENTS

| | | | |
|---|---|---|---|
| 6,634,749 B1* | 10/2003 | Morrison et al. | 351/209 |
| 7,180,476 B1* | 2/2007 | Guell et al. | 345/7 |
| 7,553,021 B2* | 6/2009 | Fergason et al. | 351/210 |
| 7,999,760 B2* | 8/2011 | Giegold et al. | 345/7 |
| 8,013,889 B1* | 9/2011 | Hong et al. | 348/148 |
| 2003/0098909 A1* | 5/2003 | Fritzsche et al. | 348/148 |
| 2003/0156257 A1* | 8/2003 | Levola | 351/210 |

(Continued)

FOREIGN PATENT DOCUMENTS

JP   06-262959 A   9/1994

(Continued)

OTHER PUBLICATIONS

Supplementary European Search Report issued in European Application No. 06823154.7—1523 / 1962509 dated Jul. 21,2010 (5 pages).

(Continued)

*Primary Examiner* — Douglas Blair
*Assistant Examiner* — Benjamin Ailes
(74) *Attorney, Agent, or Firm* — Sughrue Mion, PLLC

(57) ABSTRACT

An image around a vehicle matching the intent of a driver is automatically displayed.

An infrared camera (2) picks up an image of the face of a driver (7). A visual line direction and a face direction are detected from the face image of the driver (7). Based on the visual line direction of the driver (7) and the face direction thereof, a direction in which the driver (7) gazes is detected. When the direction in which the driver (7) gazes is included in image pickup ranges of CCD cameras (1A, 1B, and 1C), an image around a vehicle (100) picked up by any one of the CCD cameras (1A, 1B, and 1C) is automatically displayed on a monitor (6).

8 Claims, 14 Drawing Sheets

U.S. PATENT DOCUMENTS

| | | | |
|---|---|---|---|
| 2005/0073136 A1* | 4/2005 | Larsson et al. | 280/735 |
| 2005/0159893 A1 | 7/2005 | Isaji et al. | |
| 2008/0069403 A1* | 3/2008 | Breed | 382/104 |
| 2009/0005949 A1 | 1/2009 | Sugano | |
| 2010/0220288 A1* | 9/2010 | Cleveland | 351/206 |

FOREIGN PATENT DOCUMENTS

| | | |
|---|---|---|
| JP | 8-83093 A | 3/1996 |
| JP | 8-322796 A | 12/1996 |
| JP | 9-251342 A | 9/1997 |
| JP | 3019677 B2 | 3/2000 |
| JP | 2005-051403 A | 2/2005 |
| JP | 2005-081101 A | 3/2005 |
| JP | 2005-136561 A | 5/2005 |
| JP | 2005-202114 A | 7/2005 |
| JP | 2005-202876 A | 7/2005 |
| JP | 2005-231382 A | 9/2005 |
| JP | 2005-309812 A | 11/2005 |
| JP | 2007-015663 A | 1/2007 |
| WO | 2004/034905 A1 | 4/2004 |

OTHER PUBLICATIONS

Japanese Office Action issued in Japanese Application No. 2005-332714 dated Apr. 19, 2011.

* cited by examiner

VERTICAL DIRECTION

HORIZONTAL DIRECTION

FIG. 8

UNIT [°]

| GAZING DIRECTON FLAG | 2 | 3 | 4 | 1 |
|---|---|---|---|---|
| GAZING DIRECTON | FRONT LOWER DIRECTION | FRONT LEFT LOWER DIRECTION | LEFT DIRECTION | MONITOR |
| FACE DIRECTON (HORIZONTAL) | +5 ~ +25 | +25 ~ +45 | EQUAL OR OVER +45 | +10 ~ +30 |
| FACE DIRECTON (VERTICAL) | +5 ~ +15 | +5 ~ +15 | +5 ~ +15 | -15 ~ 0 |
| VISUAL LINE (HORIZONTAL) | +5 ~ +25 | +25 ~ +45 | EQUAL OR OVER +45 | +10 ~ +30 |
| VISUAL LINE (VERTICAL) | -5 ~ -15 | -5 ~ -15 | -5 ~ -15 | 0 ~ +15 |

VEHICLE SURROUNDING AREA DISPLAY DEVICE

TECHNICAL FIELD

The present invention relates to a vehicle surrounding area display device which automatically displays an image of a vehicle surrounding area matching a driver's intent.

BACKGROUND ART

Room mirrors and door mirrors are known as vehicular parts for checking a vehicle surrounding area. In addition, there is known a device that displays an image of a blind spot for a driver, picked up by a camera, on a monitor in a vehicle as an image of a vehicle surrounding area.

To cause such a device to display an image of a vehicle surrounding area, a driver has to do a switch operation when feeling the necessity. The driver feels such a switch operation troublesome.

Patent literature 1 discloses a technology which automatically displays an image of a vehicle surrounding area.

Patent Literature 1: Unexamined Japanese Patent Application KOKAI Publication No. 2005-51403

DISCLOSURE OF INVENTION

Problem to be Solved by the Invention

A vehicle surrounding area-display device disclosed in patent literature 1 estimates an image that a driver wants to display based on the movement of the head of the driver. The estimated image is automatically displayed on a monitor.

According to this technology, it is possible to merely detect the movement of the head of the driver. Accordingly, if the driver does not move his/her head, an image matching the driver's intent will not be displayed. Even though the driver moves his/her head, an image which does not match the driver's intent may be displayed in some cases.

The present invention has been made in view of the foregoing problem, and it is an object of the invention to provide a vehicle surrounding area display device which automatically displays an image of a vehicle surrounding area matching a driver's intent.

Means for Solving the Problem

To achieve the object, a vehicle surrounding area display device of the invention comprises:
- a plurality of vehicle-surrounding-area imaging units which are installed in a vehicle and which pick up images of areas around the vehicle, which are blind spots for the driver, from respective different positions;
- a display unit which is provided inside the vehicle, and which displays an image picked up by the vehicle-surrounding-area imaging unit;
- a gazing direction detection unit which detects a direction in which a driver of the vehicle gazes; and
- a display image changeover unit which selects any one of the plurality of vehicle-surrounding-area imaging units based on the driver's gazing direction detected by the gazing direction detection unit, and which causes the display unit to display an image picked up by the selected vehicle-surrounding-area imaging unit.

In the foregoing vehicle surrounding area display device of the invention,
the gazing direction detection unit may determine that a direction in which the driver continuously gazes for a predetermined time is the direction in which the driver gazes.

In the foregoing vehicle surrounding area display device of the invention,
the gazing direction detection unit may determine that a direction in which the driver gazes at predetermined times in a predetermined time is the direction in which the driver gazes.

In the foregoing vehicle surrounding area display device of the invention,
the gazing direction detection unit may determine the direction in which the driver gazes based on a visual line direction of the driver and a face direction thereof.

The foregoing vehicle surrounding area display device of the invention may further comprise;
a table used for deciding a gazing direction based on to which range in vertical and horizontal directions a face direction of the driver is headed and to which range in vertical and horizontal directions a visual line direction of the driver is headed, and wherein
the gazing direction detection unit may detect the direction in which the driver gazes based on the table.

In the foregoing vehicle surrounding area display device of the invention,
the gazing direction detection unit may perform binarization on a face image of the driver to detect black points after the driver is imaged, thereby acquiring candidates of eyes from a left region of the face image and the right region thereof, respectively.

In the foregoing structure,
the gazing direction detection unit may perform matching between the candidates of eyes in the left region and the right region and a sample of an eye set beforehand, determine a left eye image and a right eye image, acquire positional coordinates of respective black eye portions, and specify respective rotation angles of the left eye and the right eye in the vertical direction and the horizontal direction in response to an amount of misalignment in the vertical direction and the horizontal direction between the positional coordinate of the black eye portion and the center of the eye.

In the foregoing vehicle surrounding area display device of the invention,
the gazing direction detection unit may cause a reflection of infrared light from a retina of an eye of the driver by an infrared irradiation, and detect the reflective light, thereby detecting the gazing direction of the driver.

Effect of the Invention

According to the invention, it becomes possible to automatically display an image of a vehicle surrounding area matching a driver's intent.

BRIEF DESCRIPTION OF DRAWINGS

FIG. 8 is a diagram showing an example a gazing direction table;

DESCRIPTION OF REFERENCE NUMERALS

1 CCD camera set (vehicle-surrounding-area imaging unit)
2 Infrared camera (gazing direction detection unit)
3 Infrared illumination light (gazing direction detection unit)
4 Navigation device
5 Light receiving sensor
6 Monitor (display unit)
10 ECU (gazing direction detection unit, display image changeover unit)

BEST MODE FOR CARRYING OUT THE INVENTION

A vehicle surrounding area display device according to an embodiment of the invention will be explained with reference to accompanying drawings.

Figure 1:
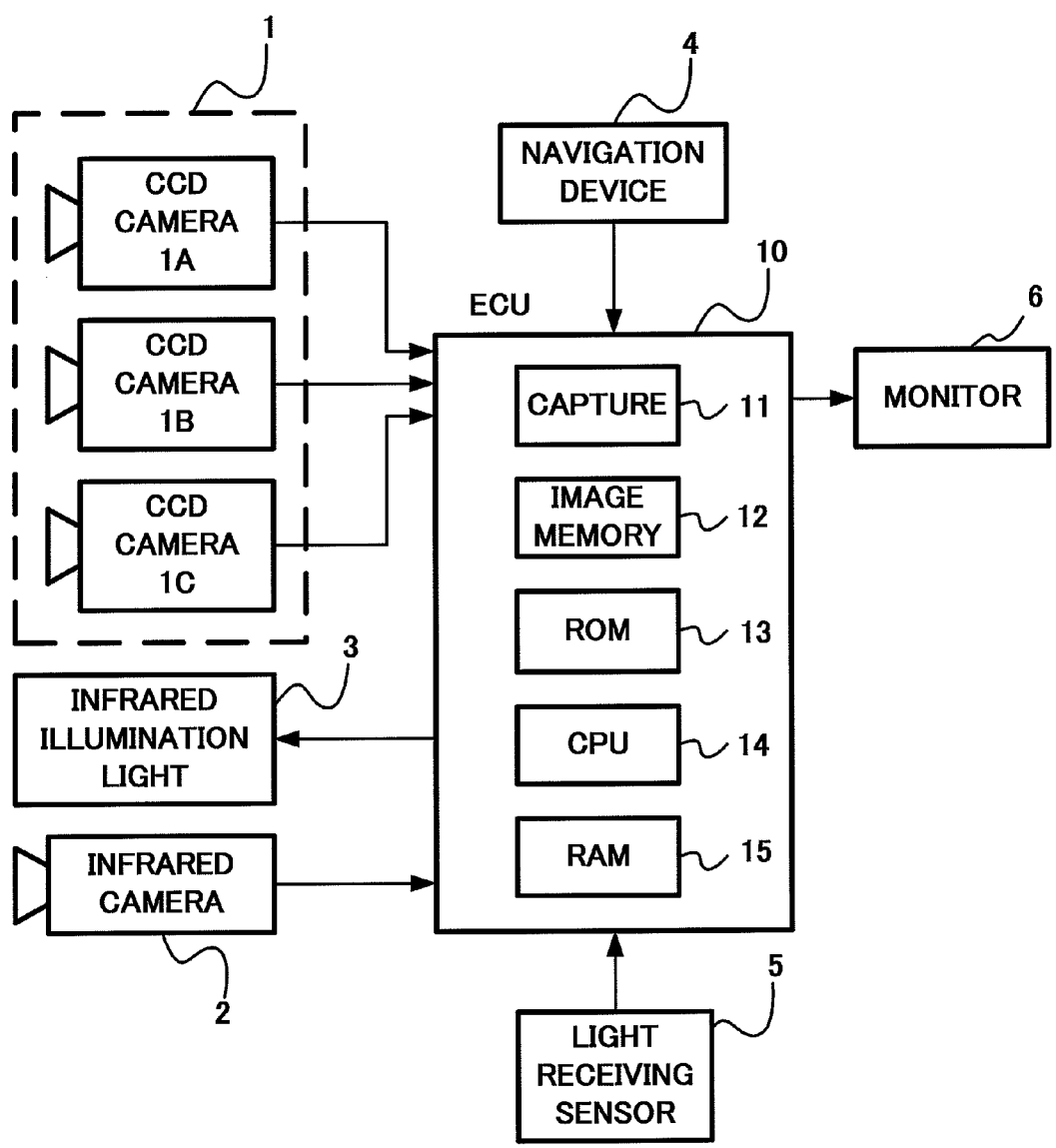
FIG. 1 is a block diagram showing the general structure of a vehicle surrounding area display device according to an embodiment of the invention.
Figure 2:
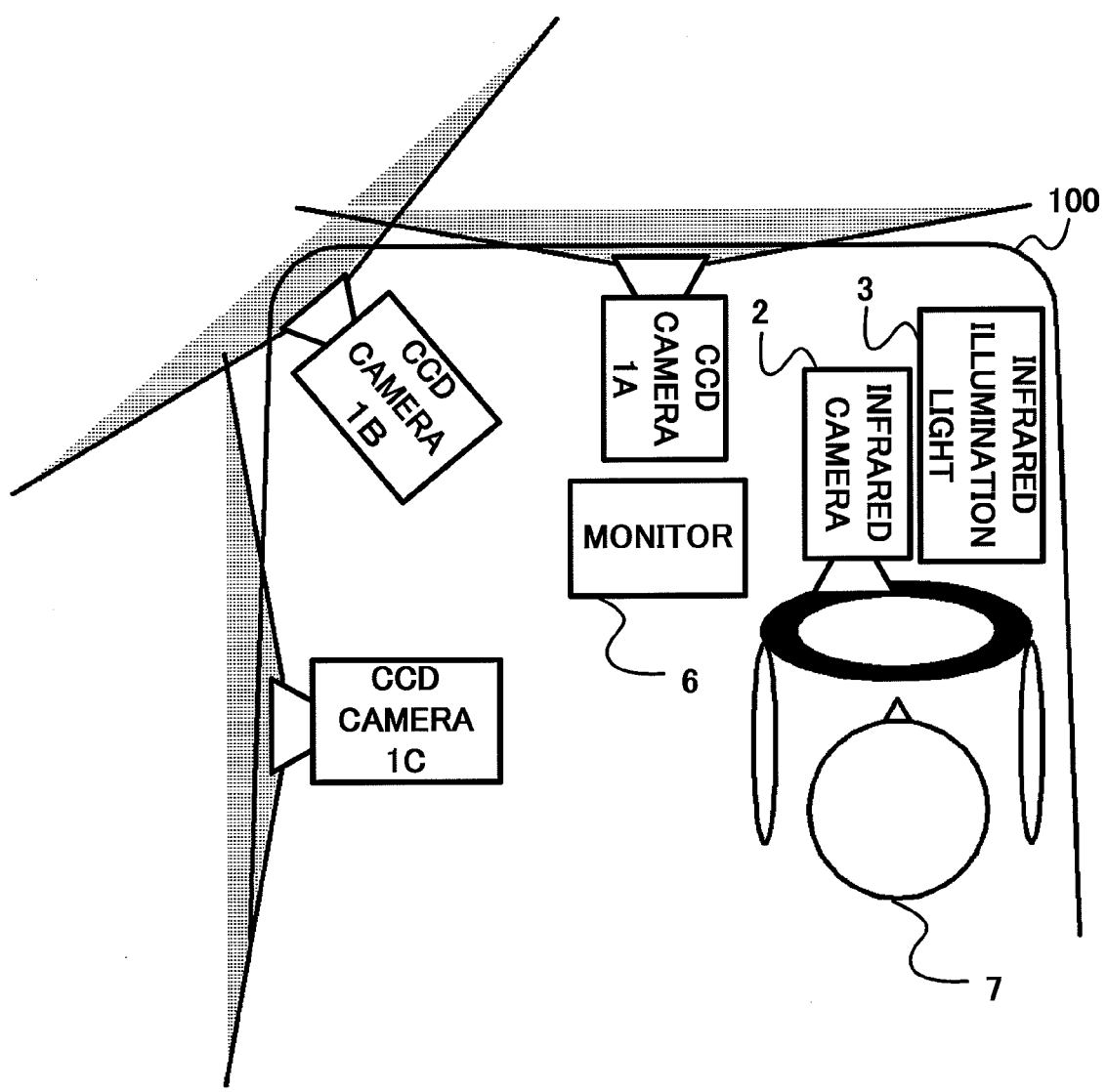
FIG. 2 is a plan view exemplifying the placement of the vehicle surrounding area display device according to the embodiment of the invention when it is installed in a vehicle.

FIG. 1 is a block diagram showing the general structure of the vehicle surrounding area display device of the embodiment. FIG. 2 is a plan view exemplifying the placement of the vehicle surrounding area display device of the embodiment when it is installed in a vehicle.

A vehicle 100 having the vehicle surrounding area display device of the embodiment is provided with a CCD (Charge Coupled Device) camera set 1, an infrared camera 2, an infrared illumination light 3, a navigation device 4, a light receiving sensor 5, a monitor 6, and an ECU (Electric Control Unit) 10. The monitor 6 constitutes a display unit which is provided inside the vehicle 100 and which displays an image.

The CCD camera set 1 includes a CCD camera 1A, a CCD camera 1B, and a CCD camera 1C. The CCD cameras 1A, 1B, and 1C are respectively embedded in a front bumper, a vehicle body, or the like.

As shown in FIG. 2, the CCD camera 1A picks up an image in the front lower direction of the vehicle 100 which is a blind spot for a driver 7. The CCD camera 1B picks up an image in the front left lower direction of the vehicle 100 which is a blind spot for the driver 7. The CCD camera 1C picks up an image in a left lower direction of the vehicle 100 which is a blind spot for the driver 7.

The CCD camera 1A is used for picking up an image of a blind spot in the front direction of the vehicle 100. The CCD camera 1B is used for picking up an image of a blind spot in the left front direction of the vehicle 100. The CCD camera 1C is used for picking up an image of a blind spot in the left direction of the vehicle 100. The CCD cameras 1A, 1B, and 1C respectively provide image signals generated by image pickup to the ECU 10. The CCD cameras 1A, 1B, and 1C constitute a plurality of vehicle-surrounding-area imaging units which pick up an image of the surrounding area of the vehicle 100.

The infrared camera 2 is mounted on the dashboard of the vehicle 100 or the vicinity of the steering wheel (e.g., on a steering column). The infrared camera 2 visualizes infrared light emitted from the driver 7 to pick up an image. The infrared camera 2 is connected to the ECU 10 to determine the gazing direction of the driver 7 from a picked-up image. The infrared camera 2 constitutes a gazing direction detection unit which detects the direction in which the driver 7 gazes.

The infrared illumination light 3 is disposed near the infrared camera 2. The infrared illumination light 3 is a device which emits infrared light. A face region of the driver 7 is irradiated with infrared light emitted from the infrared illumination light 3. The infrared illumination light 3 enables the infrared camera 2 to pick up an image even in the night time that the infrared light intensity becomes insufficient. The infrared illumination light 3 constitutes the gazing direction detection unit which detects the direction in which the driver 7 gazes.

The navigation device 4 is a device which provides map information and vehicle current position information both displayed on the monitor 6. The navigation device 4 is connected to the ECU 10 which controls the image display operation of the monitor 6.

The light receiving sensor 5 is a device which senses the brightness outside the vehicle 100. The brightness sensed by the light receiving sensor 5 is input into the ECU 10. The ECU 10 lights up the infrared illumination light 3 based on the brightness.

The ECU 10 has a capture 11, an image memory 12, a ROM (Read Only Memory) 13, a CPU (Central Processing Unit) 14, and a RAM (Random Access Memory) 15. The ECU 10 processes a face image picked up by the infrared camera 2, thereby detecting the visual line direction and the face direction of the driver 7. The ECU 10 determines the gazing direction of the driver 7 based on the visual line direction and the face direction of the driver 7. Further, the ECU 10 selects a CCD camera, which is for picking up an image to be displayed on the monitor 6, in the CCD camera set 1 based on the gazing direction of the driver 7.

The capture 11 acquires an analog signal created through an image pickup of the CCD camera set 1.

The image memory 12 stores image data picked up by the infrared camera 2.

The ROM 13 stores a program for controlling the operation of the CPU 14. The ROM 13 stores a gazing direction table for determining the gazing direction from the visual line direction and face direction of the driver 7.

The gazing direction table includes reference data for determining a direction in which the driver 7 gazes from the direction of the face of the driver 7 in the vertical and horizontal direction and the direction of the visual line thereof in the vertical and horizontal direction. As an example, as shown in FIG. 8, the gazing direction table includes data for specifying the direction in which the driver 7 gazes from a combination of the direction of the face in the horizontal direction, the direction of the face in the vertical direction, the direction of the visual line in the horizontal direction, and the direction of the visual line in the vertical direction. This data can be created based on, for example, data measured through a test or the like.

Figure 7A:
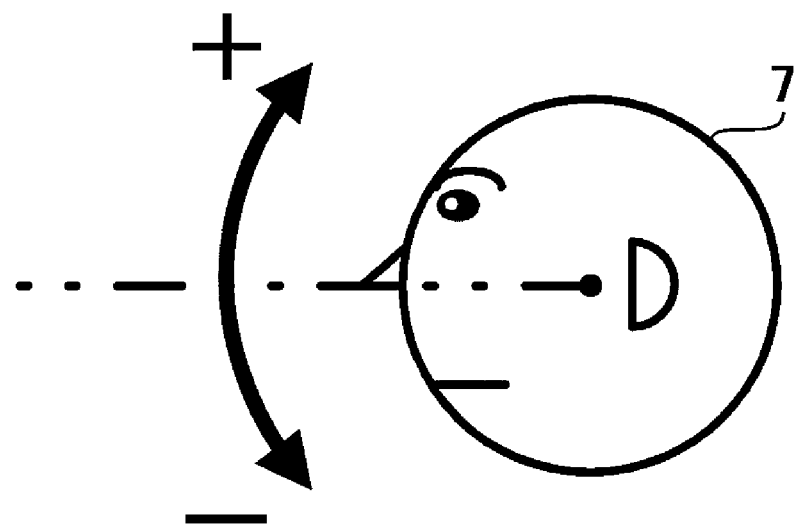
FIG. 7A is a diagram showing the meanings of symbols in a vertical direction filled in a gazing table.
Figure 7B:
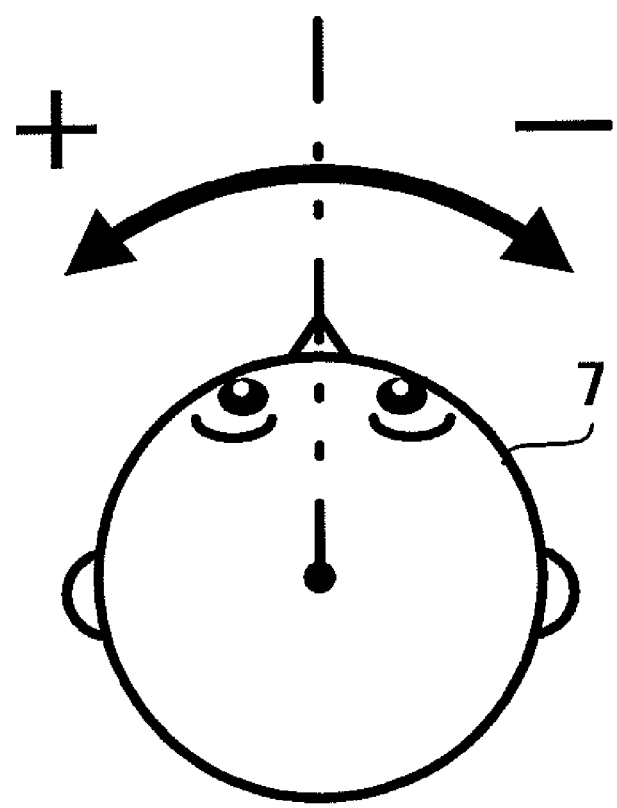
FIG. 7B is a diagram showing the meanings of symbols in a horizontal direction filled in the gazing table.
Figure 9A:
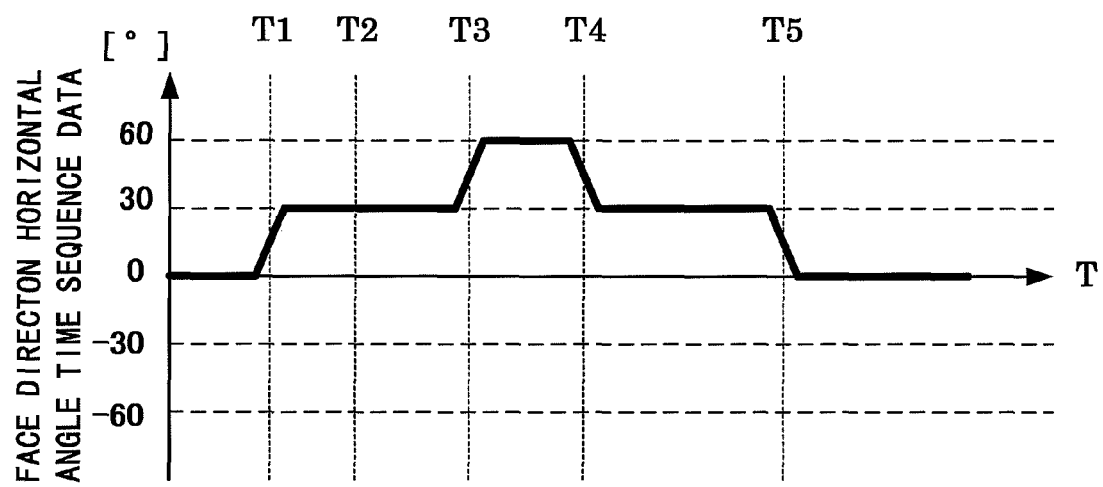
FIG. 9A is a diagram showing an example of face-direction-horizontal-angle-time-series data.
Figure 9B:
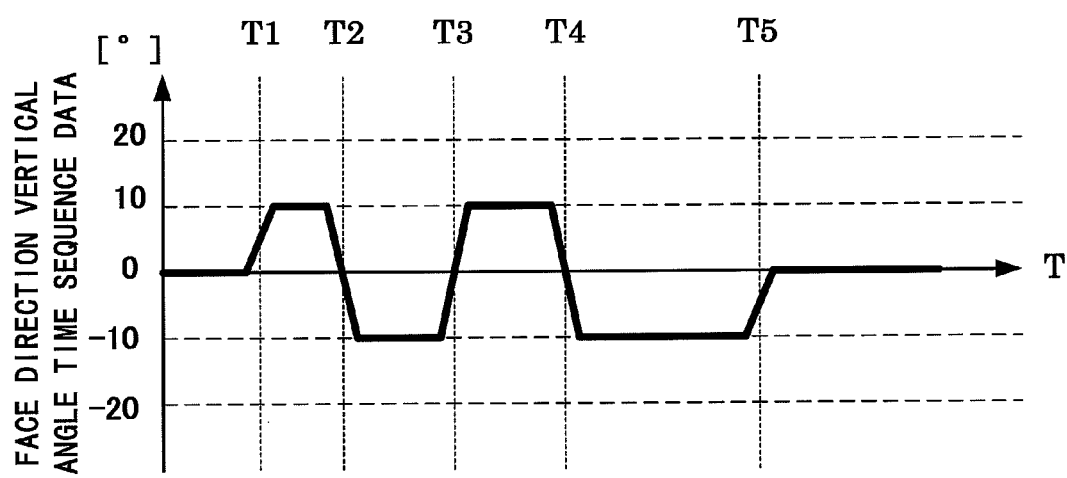
FIG. 9B is a diagram showing an example of face-direction-vertical-angle-time-series data.
Figure 9C:
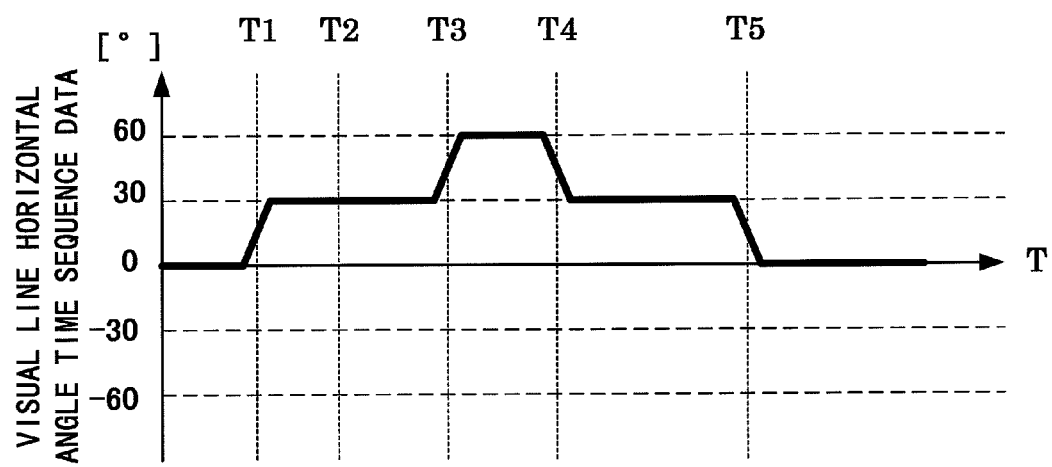
FIG. 9C is a diagram showing an example of visual-line-horizontal-angle-time-series data.
Figure 9D:
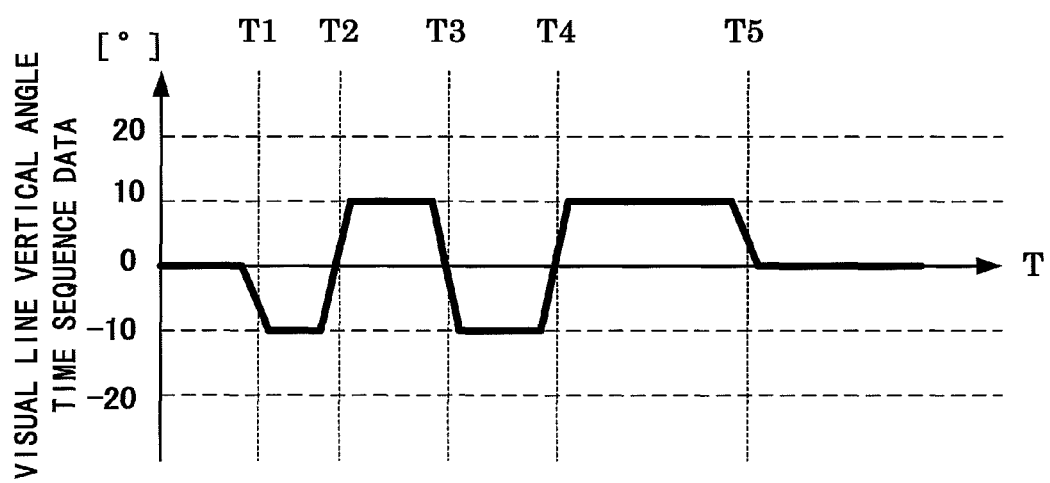
FIG. 9D is a diagram showing an example of visual-line-vertical-angle-time-series data.

FIG. 7A indicates the meanings of symbols (+/−) in the vertical direction filled in the gazing table. The negative symbol (−) in the vertical direction indicates that the face of the driver 7 is headed downward a horizontal line. The positive symbol (+) in the vertical direction indicates that the face of the driver 7 is headed upward the horizontal line. Angles filled in the gazing table are angles between the direction of the face and the horizontal line. FIG. 7B indicates the meanings of symbols (+/−) in the horizontal direction filled in the gazing table. The negative symbol (−) in the horizontal direction indicates that the face of the driver 7 is headed rightward the front direction. The positive symbol (+) in the horizontal direction indicates that the face of the driver 7 is headed leftward the front direction. Angles in the horizontal direction filled in the gazing table are angles between the direction of the face of the driver 7 and the front direction.

The CPU 14 runs the program stored in the ROM 13. The program includes a code for processing a face image of the driver 7 picked up by the infrared camera 2 to detect the visual line direction and face direction of the driver 7. The program also includes a code for determining the gazing direction of the driver 7 based on the visual line direction and face direction of the driver 7. Furthermore, the program includes a code for selecting an image to be displayed on the monitor 6 in accordance with the gazing direction of the driver 7.

The RAM 15 provides a work area for the CPU 14. The RAM 15 has a gazing direction flag indicating the gazing direction of the driver 7.

Figure 3:
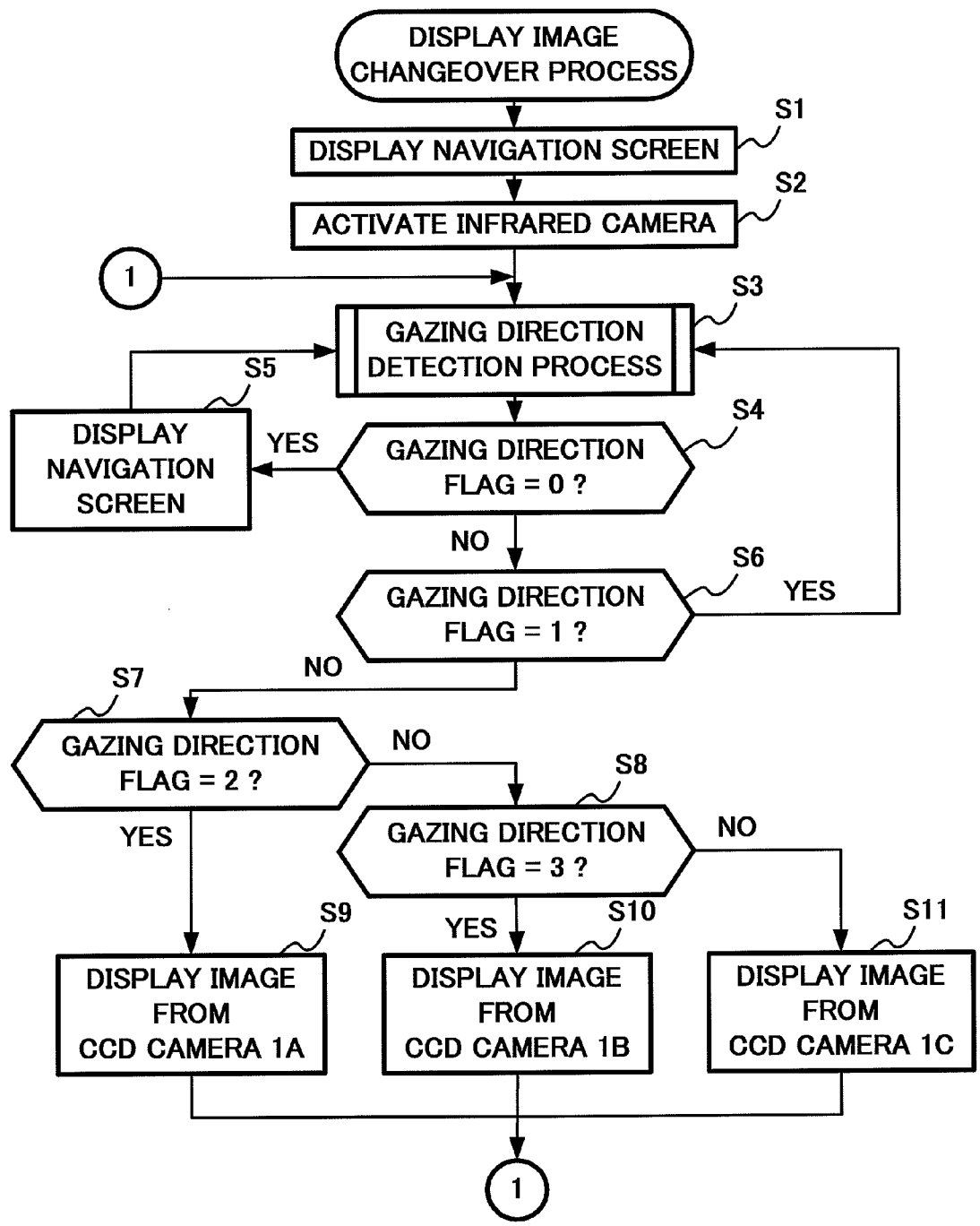
FIG. 3 is a flowchart showing an example of a display image changeover process.

Next, an explanation will be given of the operation of the vehicle surrounding area display device having the foregoing structure. As the vehicle 100 is powered on, the CPU 14 executes a display image changeover process. FIG. 3 is a flowchart showing an example of the display image changeover process executed by the CPU 14.

First, the CPU 14 turns on the monitor 6. At this time, the CPU 14 displays a navigation screen on the monitor 6 (step S1). The navigation screen includes, for example, information from the navigation device 4.

Following the step S1, the CPU 14 activates the infrared camera 2 to pick up an image of the driver 7 (step S2).

After the infrared camera 2 is activated in the step S2, the CPU 14 starts a gazing direction detection process for detecting the gazing direction of the driver 7 (step S3).

Figure 4:
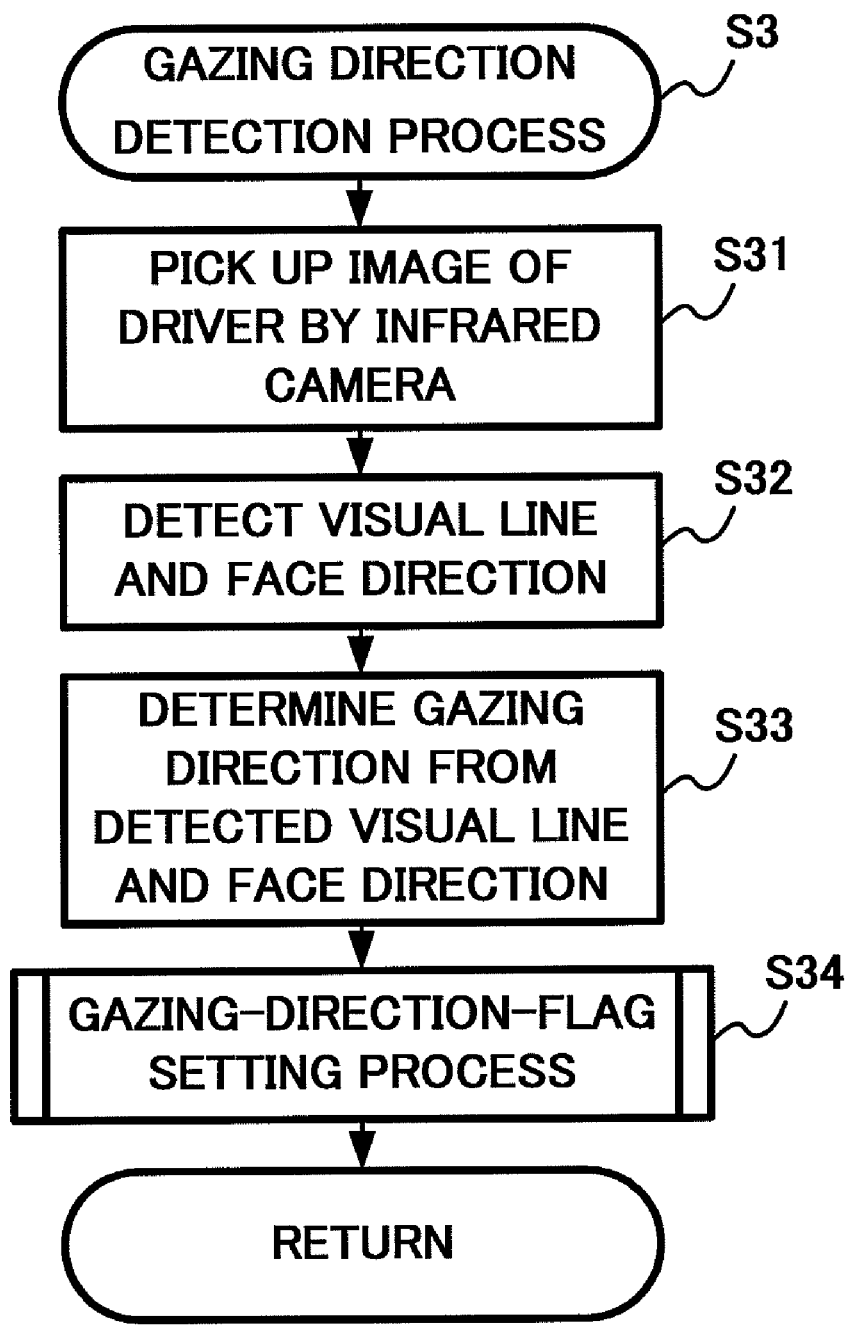
FIG. 4 is a flowchart showing an example of a gazing direction detection process.

FIG. 4 is a flowchart showing an example of the gazing direction detection process executed in the step S3 in FIG. 3. When the CPU 14 executes the gazing direction detection process, the ECU 10 constitutes the gazing direction detection unit which detects the direction in which the driver 7 gazes.

When starting the gazing direction detection process, first, the CPU 14 causes the infrared camera 2 to picks up an image of the driver 7 (step S31). Data representing a face image picked up by the infrared camera 2 is stored in the image memory 12.

Following the step S31, the CPU 14 detects the visual line direction and face direction of the driver 7 from the face image stored in the image memory 12 (step S32).

An arbitrary scheme to detect the visual line direction and face direction of the driver 7 may be adopted. As an example, the CPU 14 executes the following scheme to detect the visual line direction and face direction of the driver 7.

Figure 6A:
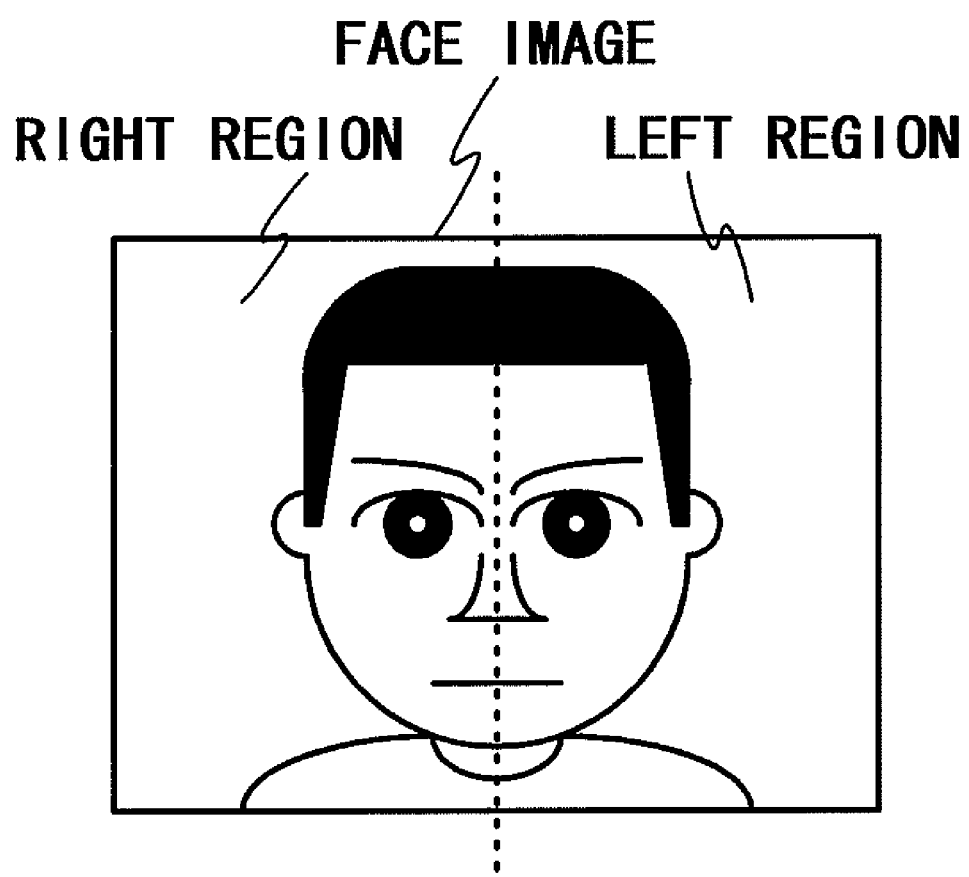
FIG. 6A is a diagram showing an example of a face image stored in an image memory.
Figure 6B:
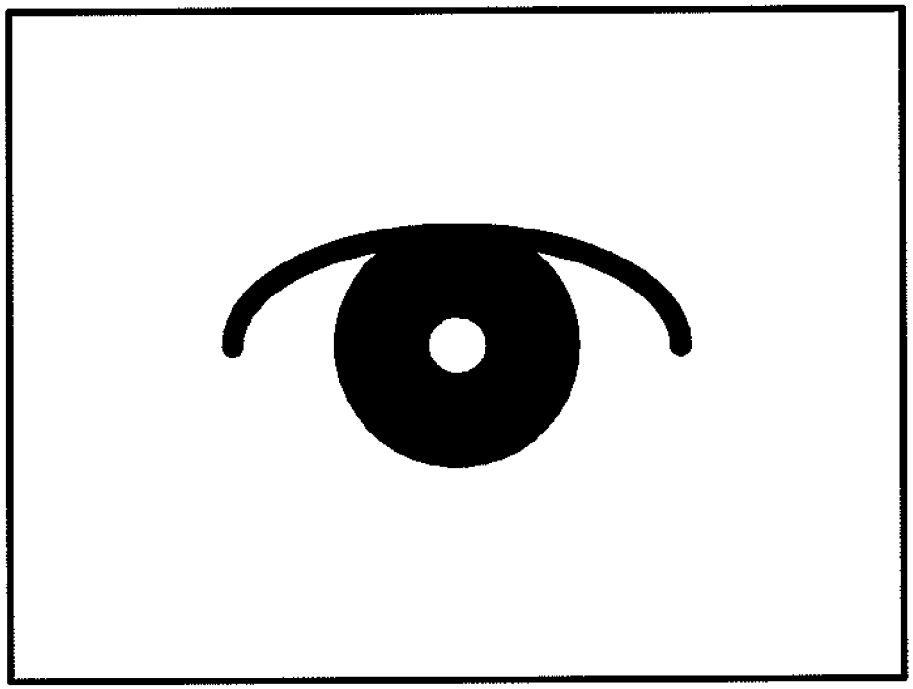
FIG. 6B is a diagram showing a sample of a typical eye.

According to this example, a face image exemplified in FIG. 6A is stored in the image memory 12. FIG. 6B shows a sample of a typical eye. Data representing the sample is stored in the ROM 13 beforehand. Regarding the visual line direction, the CPU 14 performs binarization on the face image stored in the image memory 12 and extracts black points, thereby acquiring one or plural candidates of eyes from the left region and right region of the face image, respectively.

The CPU 14 performs matching between the candidates of the individual eyes in the left region and the right region and the sample of the eye to determine a left eye image and a right eye image, thereby acquiring positional coordinates of respective black eye portions. The CPU 14 specifies rotation angles of the left eye and the right eye, respectively, in the vertical direction and the horizontal direction in accordance with the amount of misalignment between the positional coordinate of the black eye portion and the center of the eye in the vertical direction and the horizontal direction.

Regarding the face direction, first, the CPU 14 processes the face image stored in the image memory 12 with a sobel filter, and then detects lateral edge (indicating both up and bottom ends of the face) of the face of the driver 7 and the longitudinal edge (indicating both right and left ends of the face) thereof.

Subsequently, the CPU 14 specifies the gravity center (central position) of the face from the binarized image of the face.

The face direction of the driver 7 in the vertical direction and the horizontal direction is decided based on, for example, the gravity center of the face, and the positional relationship between the longitudinal edge and the lateral edge. As shown in FIG. 7A and FIG. 7B, the CPU 14 specifies the face direction of the driver 7 in the vertical direction and the horizontal direction as angles with symbols with reference to the center of the head.

After detecting the visual line direction and the face direction in the step S32, the CPU 14 determines the gazing direction of the driver 7 based on the visual line direction and the face direction (step S33).

FIG. 8 shows an example of the gazing direction table stored in the ROM 13 beforehand. The CPU 14 refers to the gazing direction table in the step S33, thereby selecting a gazing direction corresponding to a combination of the direction of the face in the horizontal direction, the direction of the face in the vertical direction, the direction of the visual line in the horizontal direction, and the direction of the visual line in the vertical direction, all detected in the step S32.

As an example, let us suppose that the CPU 14 detects that the face direction in the horizontal direction is +10°, the face direction in the vertical direction is +7°, the direction of the visual line in the horizontal direction is +15°, and the direction of the visual line in the vertical direction is −10° in the step S32. The combination of those detected directions corresponds to a combination in a first column of the gazing direction table shown in FIG. 8. The CPU 14 determines from this correspondence relationship that the gazing direction is a "front lower direction".

Following the step S33, the CPU 14 executes a gazing-direction-flag setting process (step S34). The gazing-direction-flag setting process is a process for setting the gazing direction flag provided in the RAM 15 based on the gazing direction determined in the step S33.

In the gazing-direction-flag setting process, first, the CPU 14 determines whether or not the gazing direction is a direction toward the monitor 6 (step S341). When it is determined in the step S341 that the gazing direction is the direction toward the monitor 6 (step S341: YES), the CPU 14 sets the gazing direction flag to "1" which indicates the monitor direction (step S345).

When it is determined in the step S341 that the gazing direction is not the direction toward the monitor 6 (step S341: NO), the CPU 14 determines whether or not the gazing direction is a front lower direction (step S342). When it is determined in the step S342 that the gazing direction is the front lower direction (step S342: YES), the CPU 14 sets the gazing direction flag to "2" (step S346).

When it is determined in the step S342 that the gazing direction is not the front lower direction (step S342: NO), the CPU 14 determines whether or not the gazing direction is a front left lower direction (step S343). When it is determined in the step S343 that the gazing direction is the front left lower direction (step S343: YES), the CPU 14 sets the gazing direction flag to "3" (step S347).

When it is determined in the step S343 that the gazing direction is not the front left lower direction (step S343: NO), the CPU 14 determines whether or not the gazing direction is a left direction (step S344). When it is determined in the step S344 that the gazing direction is the left direction (step S344: YES), the CPU 14 sets the gazing direction flag to "4" (step S348).

When the gazing direction is the other direction, it is determined in the step S344 that the gazing direction is not the left direction (step S344: NO). In this case, the CPU 14 sets the gazing direction flag to "0" (step S349).

After the CPU 14 ends the gazing-direction-flag setting process including the foregoing processes through the step S341 to the step S349, the gazing direction detection process (step S3) shown in FIG. 4 is also ended. At this time, the process of the CPU 14 returns to the display image changeover process shown in FIG. 3.

After returning to the display image changeover process, the CPU 14 determines whether or not the gazing direction flag is "0" (step S4). When the gazing direction flag is "0" in the step S4, the gazing direction is not included in the direction toward the monitor 6 and the image pickup range of the CCD camera set 1.

When it is determined in the step S4 that the gazing direction flag is "0" (step S4: YES), the CPU 14 changes over the display on the monitor 6 to a navigation screen (step S5). In a case where the navigation screen has been already displayed, however, the CPU 14 may not perform changeover of the display. After the process in the step S5 is executed, the process of the CPU 14 returns to the step S3 to determine again the gazing direction of the driver 7.

When it is determined in the step S4 that the gazing direction flag is not "0" (step S4: NO), the CPU 14 determines whether or not the gazing direction flag is "1" (step S6). When the gazing direction flag is "1" in the step S6, the gazing direction is included in the direction toward the monitor 6.

When it is determined in the step S6 that the gazing direction flag is "1" (step S6: YES), the process of the CPU 14 returns to the step S3 without changing over the display on the monitor 6. When the gazing flag is "1", the driver 7 is gazing a screen displayed on the monitor 6. For example, the driver 7 may see map information or the like displayed in the navigation screen. Or, the driver 7 may see an image of a vehicle surrounding area which is a blind spot. Accordingly, when the gazing direction flag is "1", it is controlled in such a way that the display on the monitor is not changed.

When it is determined in the step S6 that the gazing direction flag is not "1" (step S6: NO), the CPU 14 determines whether or not the gazing direction flag is "2" (step S7). When the gazing direction flag is "2" in the step S7, the gazing direction is included in the front lower direction.

When it is determined in the step S7 that the gazing direction flag is "2" (step S7: YES), the driver 7 is gazing the front lower direction of the vehicle 100.

In this case, the CPU 14 controls the capture 11 to cause it to capture output image data of the CCD camera 1A. The CCD camera 1A picks up an image in the front lower direction of the vehicle 100. The image data captured by the capture 11 is provided to the monitor 6. In this manner, the monitor 6 displays the image picked up by the CCD camera 1A (step S9). The image picked up by the CCD camera 1A indicates the front lower direction of the vehicle 100 included in the blind spot for the driver 7. When the process in the step S9 is executed by the CPU 14, if an image representing the front lower direction is already displayed on the monitor 6, the CPU 14 may not perform any particular control. In this case, as the capture 11 continuously captures output image data of the CCD camera 1A, the monitor 6 continuously displays images picked up by the CCD camera 1A. After the process in the step S9 is executed, the process of the CPU 14 returns to the step S3 to determine again the gazing direction of the driver 7.

When it is determined in the step S7 that the gazing direction flag is not "2" (step S7: NO), the CPU 14 determines whether or not the gazing direction flag is "3" (step S8). When the gazing direction flag is "3" in the step S8, the gazing direction is included in the front left lower direction.

When it is determined in the step S8 that the gazing direction flag is "3" (step S8: YES), the driver 7 is gazing the front left lower direction of the vehicle 100.

In this case, the CPU 14 controls the capture 11 to cause it to capture output image data of the CCD camera 1B. The CCD camera 1B picks up an image in the front left lower direction of the vehicle 100. Image data captured by the capture 11 is provided to the monitor 6. In this manner, the monitor 6 displays an image picked up by the CCD camera 1B (step S10). The image picked up by the CCD camera 1B indicates the front left lower direction included in the blind spot for the driver. When the process in the step S10 is executed by the CPU 14, if an image representing the front left lower direction is already displayed on the monitor 6, the CPU 14 may not perform any particular control. In this case, as the capture 11 continuously captures output image data of the CCD camera 1B, the monitor 6 continuously displays images picked up by the CCD camera 1B. After the process in the step S10 is executed, the process of the CPU 14 returns to the step S3 to determine again the gazing direction of the driver 7.

When it is determined in the step S8 that the gazing direction flag is not "3" (step S8: NO), the CPU 14 specifies that the gazing flag is "4". When the gazing direction flag is "4", the driver 7 is gazing the left direction of the vehicle 100.

In this case, the CPU 14 controls the capture 11 to cause it to capture output image data of the CCD camera 1C. The CCD camera 1C picks up an image in the left direction of the vehicle 100. Image data captured by the capture 11 is provided to the monitor 6. In this manner, the monitor 6 displays an image picked up by the CCD camera 1C (step S11). The image picked up by the CCD camera 1C includes the left direction of the vehicle 100 included in the blind spot for the driver. When the process in the step S11 is executed by the CPU 14, if an image representing the left direction is already displayed on the monitor 6, the CPU 14 may not perform any particular control. In this case, as the capture 11 continuously captures output image data of the CCD camera 1C, the monitor 6 continuously displays images picked up by the CCD camera 1C. After the process in the step S11 is executed, the process of the CPU 14 returns to the step S3 to detect again the gazing direction of the driver 7.

The CPU 14 repeatedly executes the foregoing process from the steps S3 to S11, thereby automatically changing over an image displayed on the monitor 6 in accordance with the gazing direction of the driver 7. When the CPU 14 executes the process from the steps S4 to S11, the ECU 10 constitutes a display image changeover unit which causes the monitor 6 to display an image picked up by any one of the CD cameras 1A, 1B, and 1C selected by the gazing direction of the driver 7.

Next, an explanation will be given of an example of the operation of the vehicle surrounding area display device of the invention with reference to the gazing direction table shown in FIG. 8 and time sequence data on the gazing direction shown in FIGS. 9A to 9D.

FIGS. 9A to 9D show time sequence data representing a direction in which the driver 7 gazes when the driver 7 starts the vehicle 100 in the left direction in a parking where another vehicle is parked on the left of the vehicle 100.

Figure 5:
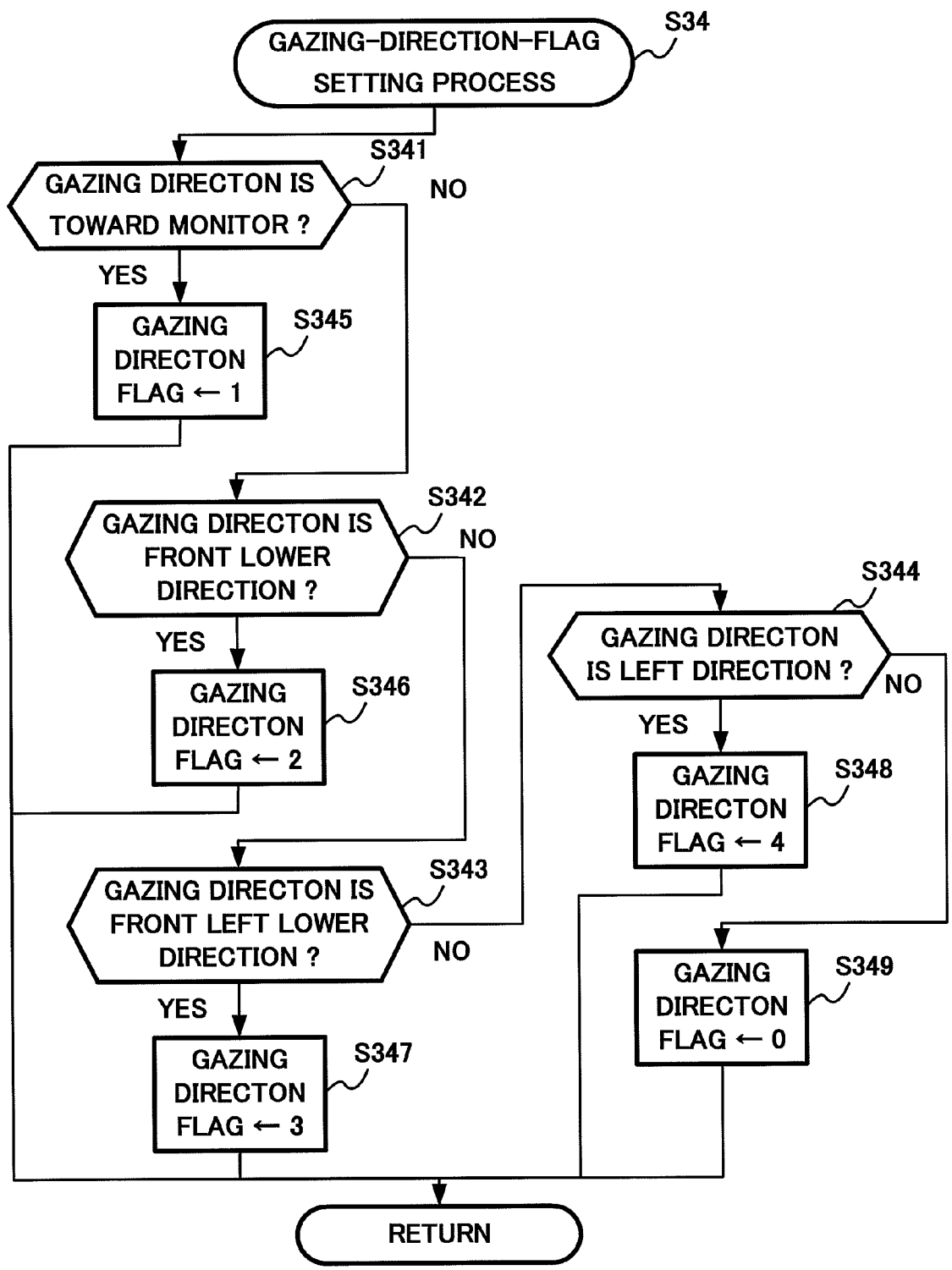
FIG. 5 is a flowchart showing an example of a gazing-direction-flag setting process.

In a period from times 0 to T1, the face direction of the driver 7 is 0° in the horizontal direction, and is 0° in the vertical direction, and the visual line of the driver 7 is 0° in the horizontal direction, and is 0° in the vertical direction. Therefore, in this period, as the driver 7 faces the front direction, the gazing direction flag is set to "0" (step S349 shown in FIG. 5). When the gazing direction flag is "0", the CPU 14 displays a navigation screen on the monitor 6 (step S5 shown in FIG. 3). In a case where the navigation screen has been displayed on the monitor 6, the CPU 14 does not change over the display on the monitor 6.

At a time T1, the face direction of the driver 7 becomes +30° in the horizontal direction, and becomes +10° in the vertical direction, and the visual line of the driver 7 becomes +30° in the horizontal direction, and becomes −10° in the vertical direction. At the time T1, the CPU 14 refers to the gazing direction table shown in FIG. 8, thereby determining that the gazing direction of the driver 7 is a front left lower direction. The gazing direction flag is set to "3" (step S347 shown in FIG. 5). In response to that the gazing direction flag becomes "3", the CPU 14 displays an image representing the front left lower direction of the vehicle 100 picked up by the CCD camera 1B on the monitor 6 (step S10 shown in FIG. 3).

At a time T2, the face direction of the driver 7 becomes +30° in the horizontal direction and becomes −10° in the vertical direction, and the visual line of the driver 7 becomes +30° in the horizontal direction, and becomes +10° in the vertical direction. At the time T2, the CPU 14 refers to the gazing direction table shown in FIG. 8, thereby determining that the gazing direction is the monitor direction. The gazing direction flag is set to "1" (step S345 shown in FIG. 5). When the gazing direction flag is "1", the CPU 14 displays images representing the front left lower direction of the vehicle 100 and successively picked up by the CCD camera 1B on the monitor 6 (steps S3, S4, and S6 shown in FIG. 3).

At a time T3, the face direction of the driver 7 becomes +60° in the horizontal direction, and becomes +10° in the vertical direction, and the visual line of the driver 7 becomes +60° in the horizontal direction, and becomes −10° in the vertical direction. At the time T3, the CPU 14 refers to the gazing direction table shown in FIG. 8, thereby determining that the gazing direction is the left direction. The gazing direction flag is set to "4" (step S348 shown in FIG. 5). In response to that the gazing direction flag becomes "4", the CPU 14 displays an image representing the left direction of the vehicle and picked up by the CCD camera 1C on the monitor 6 (step S11 shown in FIG. 3).

At a time T4, the face direction of the driver 7 becomes +30° in the horizontal direction, and becomes −10° in the vertical direction, and the visual line of the driver 7 becomes +30° in the horizontal direction, and becomes +10° in the vertical direction. At the time T4, the CPU 14 refers to the gazing direction table shown in FIG. 8, thereby determining that the gazing direction is the monitor direction. The gazing direction flag is set to "1" (step S345 shown in FIG. 5). When the gazing direction flag is "1", the CPU 14 displays images representing the left direction of the vehicle 100 and successively picked up by the CCD camera 1C on the monitor 6 (steps S3, S4, and S6 shown in FIG. 3).

At a period after a time T5, the face direction of the driver is 0° in the horizontal direction, and is 0° in the vertical direction, and the visual line of the driver 7 is 0° in the horizontal direction, and is 0° in the vertical direction. Therefore, at this period, as the driver 7 faces the front direction, the gazing direction flag is set to "0" (step S349 shown in FIG. 5). When the gazing direction flag is "0", the CPU 14 displays a navigation screen on the monitor 6 (step S5 shown in FIG. 3).

As explained above, according to the vehicle surrounding area display device of the embodiment, the CPU 14 detects the face direction of the driver 7 and the visual line thereof from an image picked up by the infrared camera 2 without a specific operation or a large drive by the driver 7. The face direction of the driver 7 and the visual line direction thereof are used for determining the gazing direction of the driver 7. The CPU 14 automatically changes over an image displayed on the monitor 6 based on the gazing direction of the driver 7. Thus, an image matching the intent of the driver 7 is automatically displayed on the monitor 6.

The present invention is not limited to the foregoing embodiment, and can be changed and modified in various forms.

For example, the determination of the gazing direction may be performed when a time that the driver 7 continuously gazes in a certain direction exceeds a predetermined threshold (e.g., one second). The time that the driver 7 gazes in the certain direction may be counted by the integration function of an arbitrary computer. Alternatively, the determination of the gazing direction may be performed based on a repetition that the driver 7 gazes in a certain direction within a predetermined period (e.g., three seconds). As an example, a direction in which the gazing repetition of the driver 7 exceeds a predetermined time (e.g., twice) may be determined as a gazing direction. The structure of determining such gazing directions may constitute the gazing direction detection unit which detects the direction in which the driver 7 gazes.

In the foregoing embodiment, the visual line direction and the face direction are detected through an image processing, and the gazing direction of the driver 7 is determined based on a combination of the face direction and the visual line direction. The method of determining the gazing direction of the driver 7, however, is not limited to the foregoing method. For example, the vehicle surrounding area display device may cause the driver 7 to be irradiated with infrared light to cause a retroreflection of the infrared light from the retina of the eye of the driver 7, and may detect the reflective light, thereby determining the gazing direction of the driver 7. Such a structure may constitute the gazing direction detection unit which detects the direction in which the driver 7 gazes.

The system structure shown in FIG. 1 and FIG. 2 is just an example, and can be changed arbitrarily. For example, in the foregoing embodiment, the CCD camera set 1 which picks up an image around the vehicle 100 includes the three CCD cameras 1A, 1B, and 1C. The number of cameras can be increased or reduced, such as installing another CCD camera on the rear of the vehicle 100.

In the foregoing embodiment, the ECU 10 performs a control for changing over an image displayed on the monitor 6. The CCD camera set 1 and the navigation device 4 may be connected to an image selector or the like. According to such a structure, the image selector changes over an image displayed on the monitor 6 under the control of the ECU 10.

In the foregoing embodiment, the explanation has been given of the vehicle surrounding area display device installed in the vehicle 100 with a right hand steering wheel. In case of a left-hand drive car, the installation position of the CCD camera set 1 is changed from left to right. In addition, in detecting the face direction of the driver 7 and the visual line direction thereof, the symbols of positive (+) and negative (−) indicating the face direction in the horizontal direction, and the symbols of positive (+) and negative (−) indicating the visual line in the horizontal direction can be changed reversely.

In the forgoing embodiment, the program executed by the CPU 14 is stored in the ROM 13. However, the program to be executed by the CPU 14 may be stored in an arbitrary memory medium beforehand, or may be distributed via an electric communication network, and then stored in an arbitrary memory medium.

In the foregoing embodiment, even when it is detected that the driver 7 gazes the monitor 6, a navigation screen is continuously displayed on the monitor 6. However, the display on the monitor may be turned off to prevent the driver 7 from reducing the attentiveness when it is detected that the driver 7 gazes the monitor 6.

This application is based on Japanese Patent Application No. 2005-332714 filed on Nov. 17, 2005. The specification, claims, and drawings of Japanese Patent Application No. 2005-332714 are hereby incorporated in this specification entirely by reference.

Industrial Applicability

The present invention is useful as a display device that displays an image around a vehicle which is a blind spot for a driver. For example, the present invention can be applied to a display device that automatically changes over an image around the vehicle displayed on a monitor.

The invention claimed is:

1. A vehicle surrounding area display device comprising:
   a plurality of vehicle-surrounding-area imaging units which are installed in a vehicle and which pick up images of areas around the vehicle, which are blind spots for a driver, from respective different positions;
   a display unit which is provided inside the vehicle, and which displays an image picked up by the vehicle-surrounding-area imaging unit;
   a gazing direction detection unit which detects a direction in which the driver of the vehicle gazes;
   a display image changeover unit which selects any one of the plurality of vehicle-surrounding-area imaging units based on the driver's gazing direction detected by the gazing direction detection unit, and which causes the display unit to display an image picked up by the selected vehicle-surrounding-area imaging unit; and
   a determination unit which determines whether or not the driver's gazing direction is a direction toward the display unit;
   wherein, if the determination unit determines that the driver's gazing direction is the direction toward the display unit, the display image changeover unit maintains the selection of the vehicle-surrounding area imaging unit while the driver's gazing direction is directed toward the display unit.

2. The vehicle surrounding area display device according to claim 1, wherein the gazing direction detection unit determines that a direction in which the driver continuously gazes for a predetermined time is the direction in which the driver gazes.

3. The vehicle surrounding area display device according to claim 1, wherein the gazing direction detection unit determines that a direction in which the driver gazes at predetermined times within a predetermined time is the direction in which the driver gazes.

4. The vehicle surrounding area display device according to claim 1, wherein the gazing direction detection unit determines the direction in which the driver gazes based on a visual line direction of the driver and a face direction thereof.

5. The vehicle surrounding area display device according to claim 1, further comprising a table used for deciding a gazing direction based on to which range in vertical and horizontal directions a face direction of the driver is headed and to which range in vertical and horizontal directions a visual line direction of the driver is headed, and wherein the gazing direction detection unit detects the direction in which the driver gazes based on the table.

6. The vehicle surrounding area display device according to claim 1, wherein the gazing direction detection unit performs binarization on a face image of the driver to detect black points after the driver is imaged, thereby acquiring candidates of eyes from a left region of the face image and the right region thereof, respectively.

7. The vehicle surrounding area display device according to claim 6, wherein the gazing direction detection unit performs matching between the candidates of eyes in the left region and the right region and a sample of an eye set beforehand, determines a left eye image and a right eye image, acquires positional coordinates of respective black eye portions, and specifies respective rotation angles of the left eye and the right eye in the vertical direction and the horizontal direction in response to an amount of misalignment in the vertical direction and the horizontal direction between the positional coordinate of the black eye portion and the center of the eye.

8. The vehicle surrounding area display device according to claim 1, wherein the gazing direction detection unit causes a reflection of infrared light from a retina of an eye of the driver by an infrared irradiation, and detects the reflective light, thereby detecting the gazing direction of the driver.

* * * * *